(12) United States Patent
Park et al.

(10) Patent No.: US 8,098,821 B2
(45) Date of Patent: Jan. 17, 2012

(54) DATA ENCRYPTION/DECRYPTION METHOD AND MOBILE TERMINAL FOR USE IN THE SAME

(75) Inventors: Yeon Woo Park, Seoul (KR); Sang Yeon Lim, Seongnam-si (KR); Seo Young Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 1133 days.

(21) Appl. No.: 11/594,185

(22) Filed: Nov. 8, 2006

(65) Prior Publication Data

US 2007/0115344 A1 May 24, 2007

(30) Foreign Application Priority Data

Nov. 8, 2005 (KR) .................. 10-2005-0106470
Jan. 20, 2006 (KR) .................. 10-2006-0006452

(51) Int. Cl.
*H04N 7/14* (2006.01)
(52) U.S. Cl. .................. 380/237; 380/14.01

(58) Field of Classification Search .......... 713/282, 713/289; 726/26, 27, 28, 29, 30
See application file for complete search history.

(56) References Cited

U.S. PATENT DOCUMENTS

| 2005/0064913 A1* | 3/2005 | Kim .................. 455/567 |
| 2006/0060068 A1* | 3/2006 | Hwang et al. .................. 84/615 |
| 2008/0163287 A1* | 7/2008 | Fernandez .................. 725/31 |
| 2009/0034800 A1* | 2/2009 | Vau et al. .................. 382/107 |

FOREIGN PATENT DOCUMENTS

KR  10-2000-0066465 A  11/2000
KR  10-0551630 B1  2/2006

* cited by examiner

*Primary Examiner* — Vivek Srivastava
*Assistant Examiner* — Nega Woldemariam
(74) *Attorney, Agent, or Firm* — Birch, Stewart, Kolasch & Birch, LLP (57) ABSTRACT

A mobile terminal including a sensing unit configured to detect a motion of the mobile terminal, and a controller configured to calculate at least one from a degree and a pattern of the terminal motion detected by the sensing unit, and to encrypt input data according to the calculated value.

16 Claims, 10 Drawing Sheets

DATA ENCRYPTION/DECRYPTION METHOD AND MOBILE TERMINAL FOR USE IN THE SAME

This application claims the benefit of Korean Patent Application Nos. 10-2005-0106470, filed on Nov. 8, 2005, and 10-2006-0006452 filed on Jan. 20, 2006, which is hereby incorporated by reference as if fully set forth herein.

BACKGROUND OF THE INVENTION

1. Field of the Invention

The present invention relates to a data encryption/decryption method, and more particularly to a data encryption/decryption method for locking data and a corresponding mobile terminal.

2. Discussion of the Related Art

Figure 1:
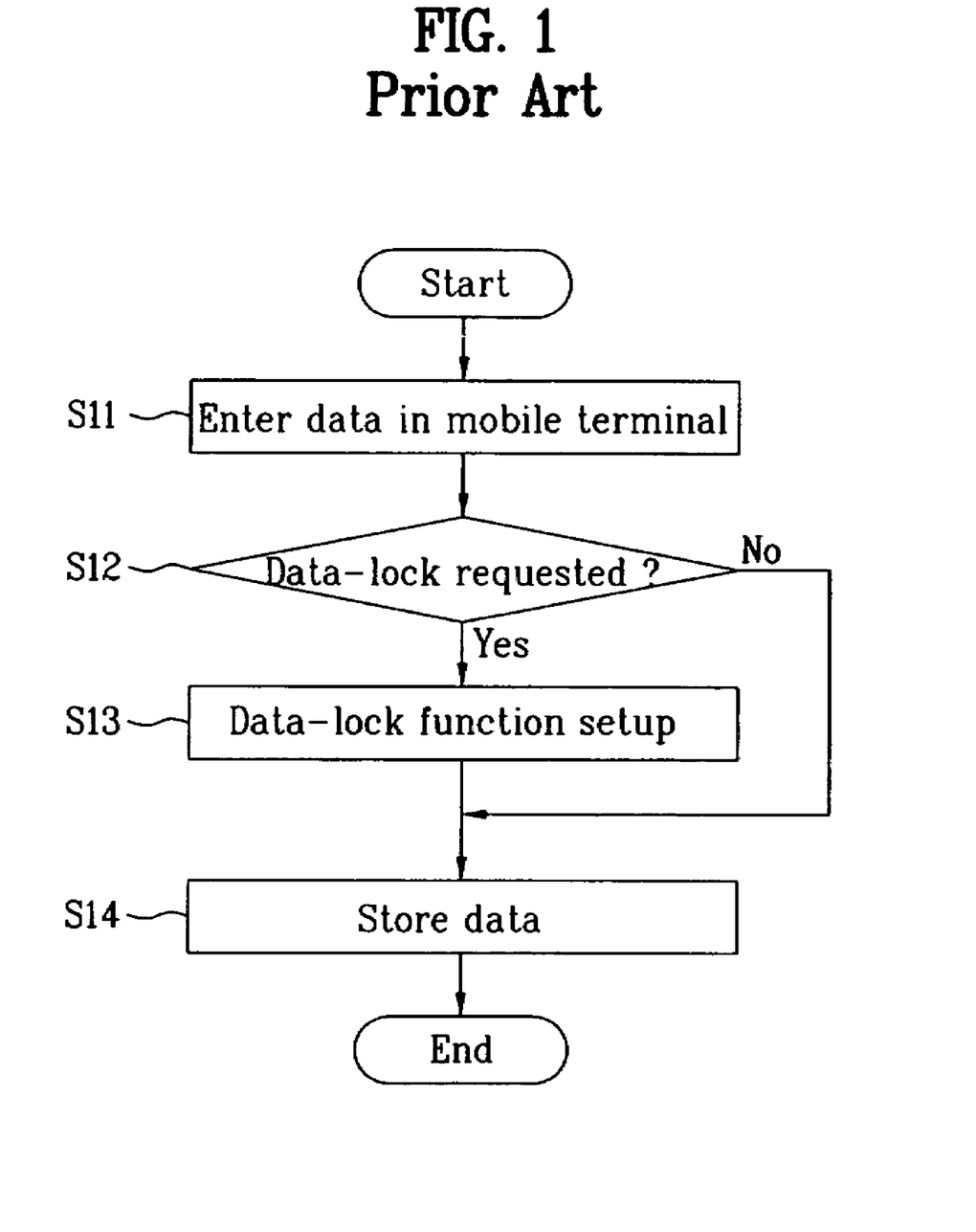
FIG. 1 is a flowchart illustrating a related art method for storing data in a mobile terminal.

FIG. 1 is a flow chart illustrating a related art method for storing data in a mobile terminal. Referring to FIG. 1, if data (e.g., character-data, video-data, and audio-data) is applied to a mobile terminal at step S11, the mobile terminal determines the presence or absence of a protection request (i.e., a data-lock function) for the input data at step S12.

If the presence of the protection request is determined (yes at step S12), the mobile terminal establishes the lock function via a menu function at step S13 such that the lock function is established in the input data at step S14.

Generally, the related art lock function assigns a password or code to the input data so as to prevent fraudulent users other than a specific authenticated user from viewing the input data. However, the conventional lock function does not encrypt the input data.

Figure 2:
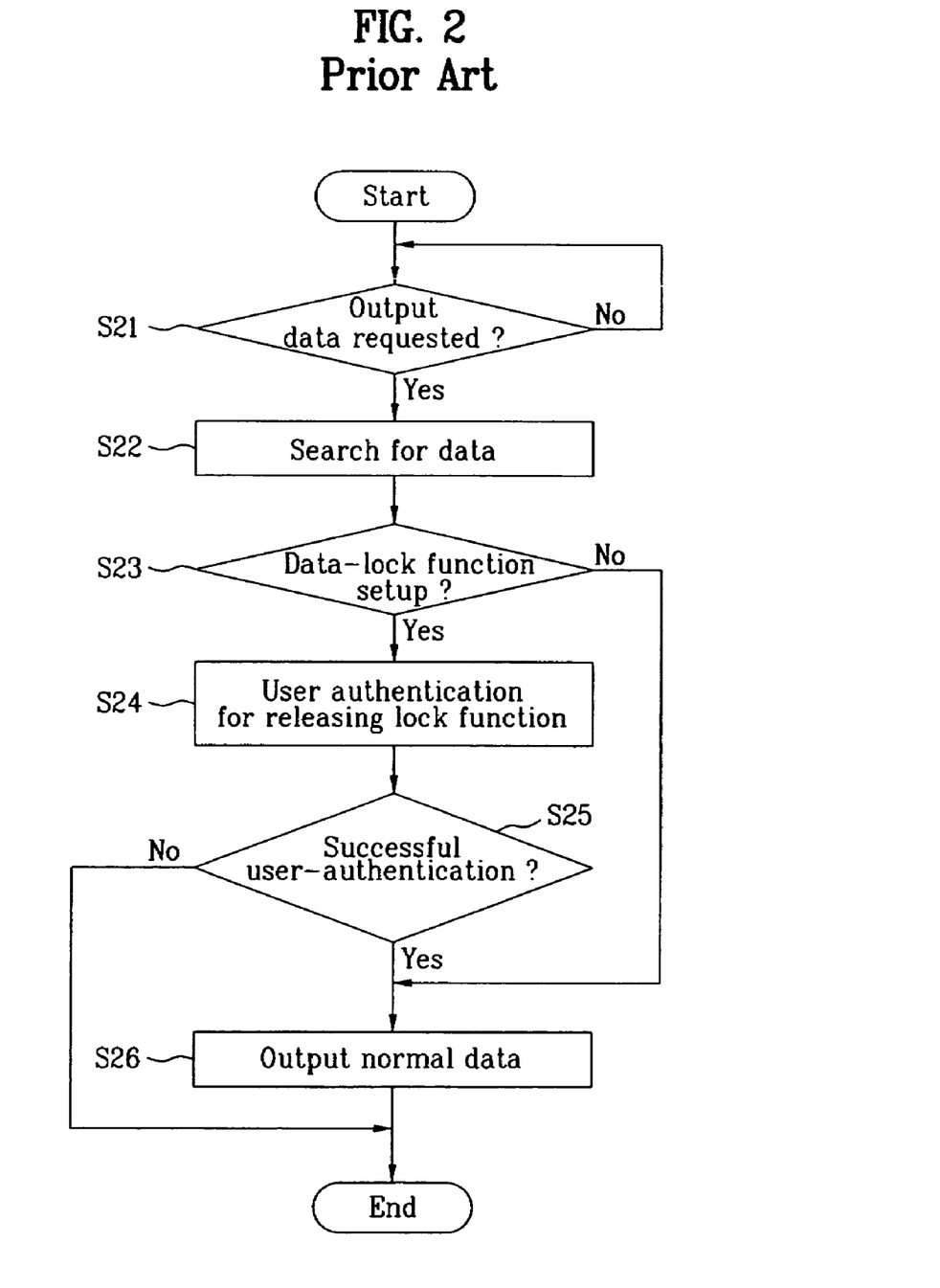
FIG. 2 is a flowchart illustrating a related art method for outputting data of the mobile terminal.

Next, FIG. 2 is a flowchart illustrating a conventional method for allowing a mobile terminal to output data. Referring to FIG. 2, if there is a data output request for any one of various data (e.g., character-data, video-data, and audio-data, etc.) stored in the mobile terminal at step S21, the mobile terminal searches for the requested data from among the data stored in the mobile terminal at step S22.

Subsequently, the mobile terminal determines the presence or absence of a lock function in the retrieved data at step S23. If the presence of the lock function of the retrieved data is determined (yes at step S23), the mobile terminal performs a user authentication process for releasing the lock function at step S24.

If the user authentication is successful (yes at step S25), the mobile terminal outputs the requested data at step S26. Otherwise, if the user authentication fails (no at step S25), the mobile terminal may not output the requested data, or may re-attempt the user authentication process.

As described above, the related art mobile terminal has a very simple lock function for the input data. In addition, when outputting a list of data stored in the mobile terminal, the mobile terminal displays data (i.e., locked data) having the lock function and other data (i.e., unlocked data) having no lock function in different ways, such that a third party other than an authenticated user can easily distinguish between the locked data and the unlocked data. Thus, the third party may interfere with the authenticated user's privacy.

Therefore, there is a need for an improved method for allowing the third party to be unaware of the presence or absence of the lock function.

SUMMARY OF THE INVENTION

Accordingly, one object of the present invention is to address the above-noted and other problems.

Another object of the present invention is to provide a data encryption/decryption method and corresponding mobile terminal, which automatically locks data according to the motion of the mobile terminal instead of a simple data-lock function.

Another object of the present invention is to provide a data encryption/decryption method and a corresponding mobile terminal, which perform transmission/reception of encrypted data between another mobile terminal such that data is shared between the mobile terminals.

To achieve these objects and other advantages an in accordance with the purpose of the invention, as embodied and broadly described herein, the present invention provides in one aspect a mobile terminal including a sensing unit configured to detect a motion of the mobile terminal and a controller configured to calculate at least one from a degree and a pattern of the terminal motion detected by the sensing unit, and to encrypt input data according to the calculated value. The present invention also provides a corresponding method to encrypt the data.

In another aspect, the present invention provides a mobile terminal including a communication unit configured to receive encrypted data, a sensing unit configured to detect a motion of the mobile terminal, and a controller configured to calculate a value of at least one from a degree and a pattern of the terminal motion, and to decrypt the encrypted data if the calculated value is equal to an encryption value established in the data. The present invention also provides a corresponding method to decrypt the encrypted data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

First Preferred Embodiment

The first preferred embodiment of the present invention relates to a method for encrypting/decrypting data. In more detail, FIG. 3 is a block diagram illustrating a mobile terminal capable of encrypting input data according to an embodiment of the present invention.

Figure 3:
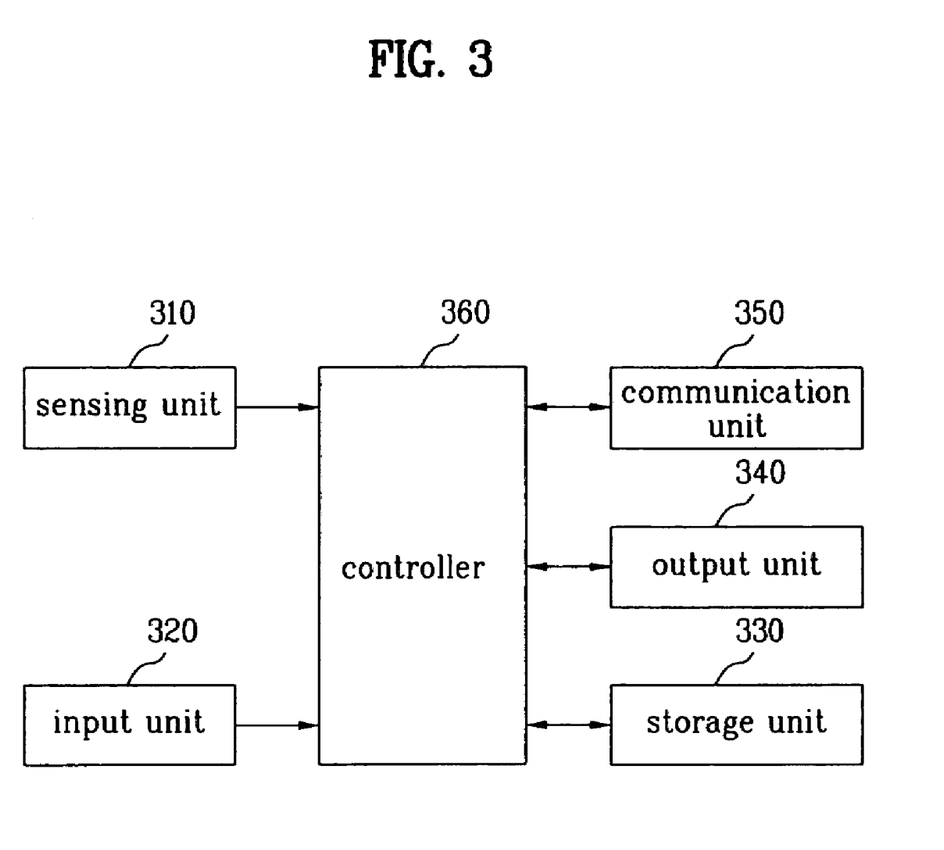
FIG. 3 is a block diagram illustrating a mobile terminal capable of encrypting input data according to an embodiment of the present invention.

As shown in FIG. 3, the mobile terminal includes a sensing unit 310, an input unit 320, a storage unit 330, an output unit 340, a communication unit 350, and a controller 360. The sensing unit 310 is preferably a gyroscope sensor (also called a gyro-sensor).

In addition, the sensing unit 310 detects the motion of the mobile terminal according to an external force (e.g., an external impact or vibration). In other words, the sensing unit 310 detects the degree of the terminal motion.

In more detail, the sensing unit 310 includes a specific rotation body to detect characteristics of a dynamic motion of the rotation body such that the sensing unit 310 can detect the motion of the mobile terminal. The sensing unit 310 detects any one of the degree and pattern of the terminal motion based on speed-information, acceleration-information, and direction-information of the terminal motion.

Therefore, if a user moves his or her mobile terminal, the sensing unit 310 measures the direction and speed (or acceleration) of the moving terminal. Further, the input unit 320 acting as a user interface includes a plurality of number keys and a plurality of function keys such that the input unit 320 outputs a variety of key signals associated with the above-mentioned keys to the controller 360.

Also, the input unit 320 preferably includes not only the above-mentioned keys but also a touch-panel or touch-screen for the mobile terminal. In addition, the storage unit 330 stores a specific program for controlling the overall operations of the mobile terminal, and includes various I/O (Input/Output) data for controlling the mobile terminal. The storage unit 330 also stores encrypted data (or modified-data or distorted-data) according to an embodiment of the present invention.

Further, the output unit 340 outputs normal data or encrypted data (or modified or distorted data), and includes a display (not shown) and a sound generator (not shown) such as a speaker. The display displays the normal data or the encrypted (or modified or distorted) character-data or video-data on a screen of the mobile terminal. The sound generator audibly outputs normal audio data or encrypted (or modified or distorted) audio data.

The communication unit 350 transmits the normal data or the encrypted (or modified or distorted) data to another mobile terminal. Similarly, the communication unit 350 receives encrypted data from the other mobile terminal.

When the sensing unit 310 detects the motion degree and the motion pattern of the mobile terminal, and outputs the detected result to the controller 360, the controller 360 numerically calculates any one of the motion degree and the motion pattern of the mobile terminal. The controller 360 then modifies or distorts input data (e.g., character-data, video-data, or audio-data) received via the input unit 320 according to the calculated value such that the controller 360 encrypts the input data. In addition, although the data received via the input unit 320 is exemplarily used as the input data, the input data may also include data received from other mobile terminals.

Figure 4:
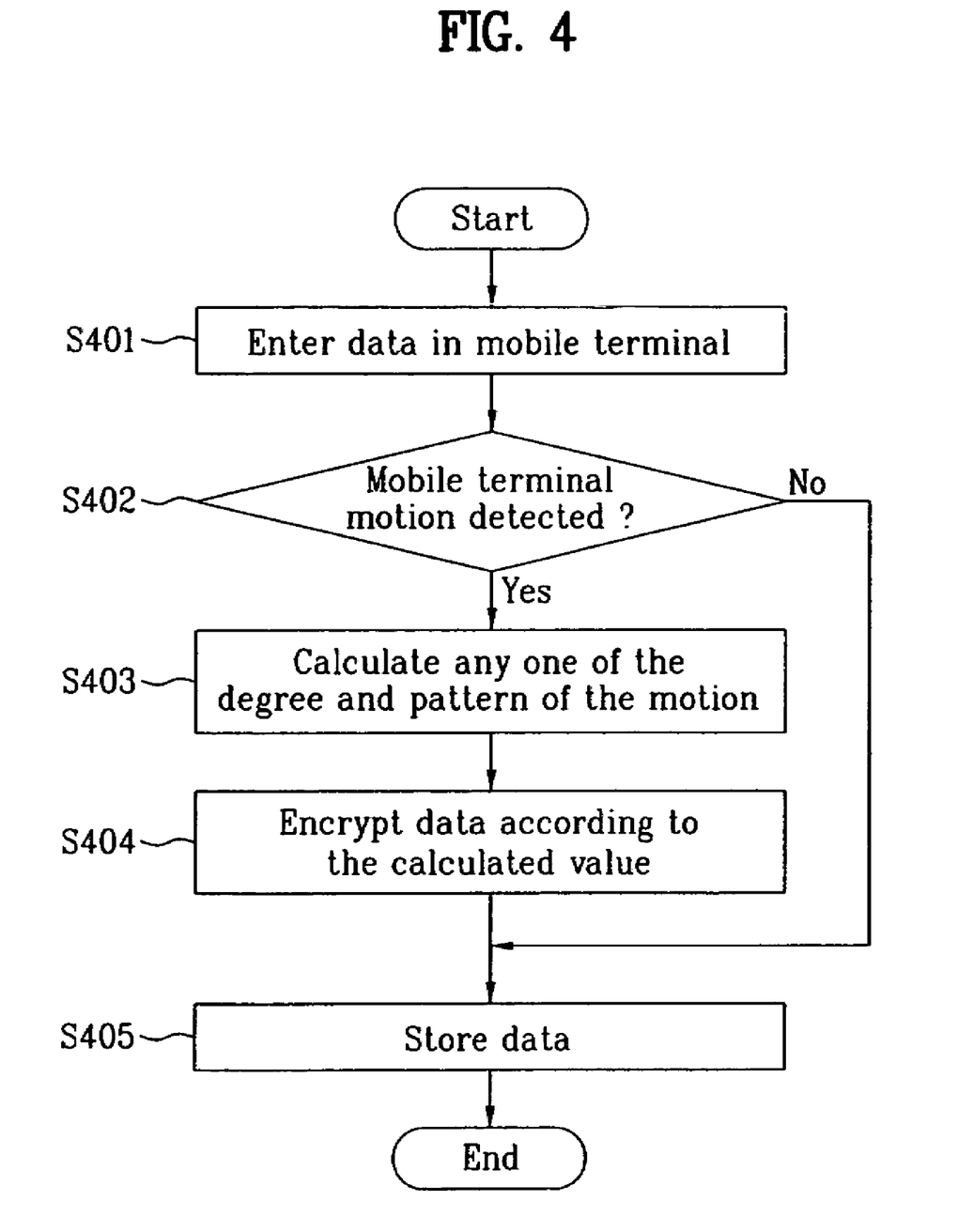
FIG. 4 is a flowchart illustrating a data encryption method according to an embodiment of the present invention.

A method for encrypting, storing, and outputting data will now be described. In more detail, FIG. 4 is a flowchart illustrating a data encryption method according to an embodiment of the present invention. FIG. 3 will also be referred to in this description.

Referring to FIG. 4, upon receiving data (e.g., multimedia data such as character-data, video-data and audio-data) from the input unit 320 of a mobile terminal at step S401, the controller 360 determines whether the sensing unit 310 detects the motion of the mobile terminal at step S402.

If the motion of the mobile terminal is detected (yes at step S402), the controller 360 numerically calculates the degree and/or pattern of the terminal motion detected by the sensing unit 310 at step 403. The controller 360 then modifies or distorts the input data based on the calculated value such that the controller 360 encrypts the input data at step S404.

It should be noted that the encryption concept of the present invention is to modify or distort the output data of the mobile terminal such that the encrypted data is stored in the mobile terminal. The data modification changes the order of data arrangements and includes inserting data into the normal data.

1) Encryption of Character Data (Step 404 in FIG. 4)

Prior to describing a method for encrypting character data according to an embodiment of the present invention, it is noted the character data indicates specific character data (e.g., SMS messages, memo data, phonebook data, schedule data, etc.) stored in the mobile terminal and also user-entered character data.

The method for encrypting the character data includes a first process for changing an arrangement order of the character data to another other arrangement according to the terminal motion, thereby encrypting the character data; a second process for shadowing or covering the character data according to the terminal motion, thereby encrypting the character data; and a third process for inserting predetermined characters in the character data, thereby encrypting the character data.

The above-mentioned first process will now be described with reference to FIG. 5. In more detail, FIG. 5 is a conceptual diagram illustrating a method for encrypting character data according to a first example of the present invention.

Figure 5:
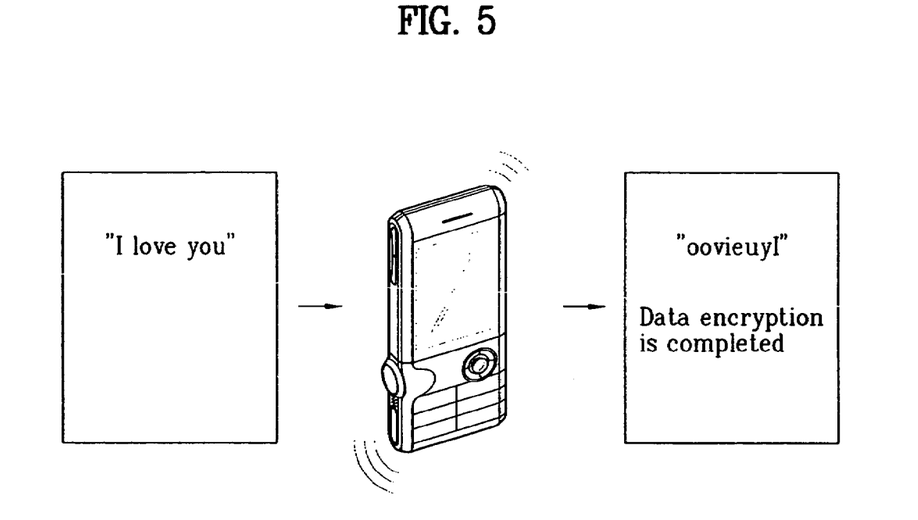
FIG. 5 is a conceptual diagram illustrating a method for encrypting character data according to an embodiment of a first example of the present invention.

Referring to FIG. 5, if the user moves or shakes his or her mobile terminal after the character data "I love you" is input to the mobile terminal, the mobile terminal changes the arrangement order of the character data "I love you" to another arrangement order such that the encrypted data "oovleuyI" occurs.

Next, the above-mentioned second process will hereinafter be described with reference to FIG. 6. In more detail, FIG. 6 is a conceptual diagram illustrating a method for encrypting character data according to a second example of the present invention.

Figure 6:
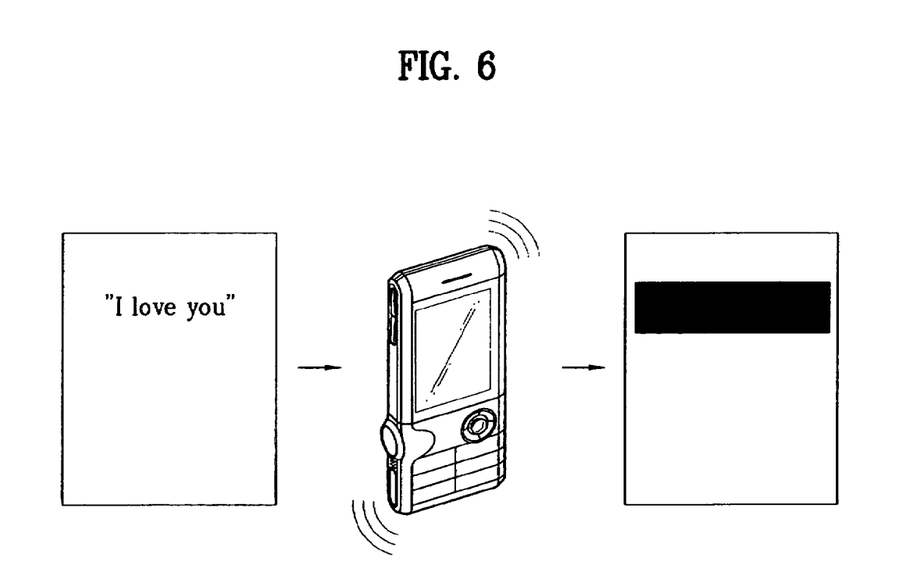
FIG. 6 is a conceptual diagram illustrating a method for encrypting character data according to a second example of the present invention.

Referring to FIG. 6, if the user moves or shakes his or her mobile terminal after character data "I love you" is input to the mobile terminal, the mobile terminal shadows or covers the character data "I love you" according to the motion of the user, thereby encrypting the character data. That is, the character data is covered such that the data can not be reviewed on the terminal.

Next, the above-mentioned third process will hereinafter be described with reference to FIG. 7. In more detail, FIG. 7 is a conceptual diagram illustrating a method for encrypting character data according to a third example of the present invention.

Figure 7:
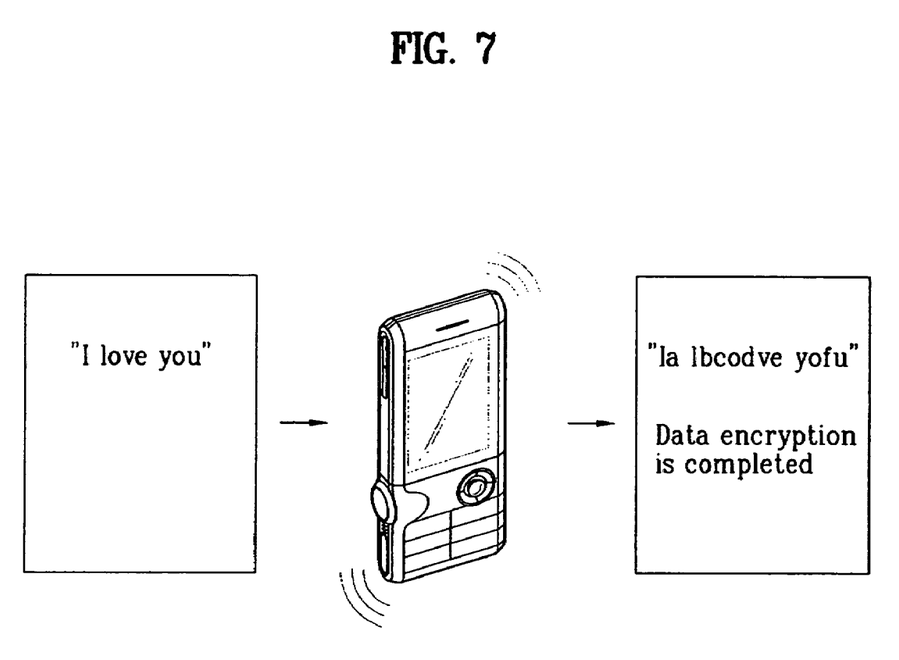
FIG. 7 is a conceptual diagram illustrating a method for encrypting character data according to a third example of the present invention.

Referring to FIG. 7, if the user moves or shakes his or her mobile terminal after the character data "I love you" is input to the mobile terminal, the mobile terminal inserts predetermined characters ("abcdef") into the character data "I love you" according to the motion of the user, thereby encrypting the character data.

2) Encryption of Video Data

Prior to describing a method for encrypting video data according to an embodiment of the present invention, it is noted that the video data includes a picture or moving image captured by a camera (not shown) contained in the mobile terminal or a downloaded picture or moving image.

First, the mobile terminal changes the arrangement order of video-data pixels to another arrangement order according to the motion of the mobile terminal, thereby encrypting the video data. Secondly, the mobile terminal adjusts video-data parameters (e.g., color-value, brightness-value, chromaticity-value, and motion vector-values, etc.) according to the terminal motion, thereby encrypting the video data.

Thirdly, the mobile terminal inserts predetermined pixels corresponding to the terminal motion into the video data, thereby encrypting the video data. Fourthly, the mobile terminal performs a mosaic process on the video data, thereby encrypting the video data. Fifthly, the mobile terminal modifies or distorts the video data according to the terminal motion, thereby encrypting the video data. Sixthly, the mobile terminal rotates the video data according to the terminal motion, thereby encrypting the video data.

Figure 8:
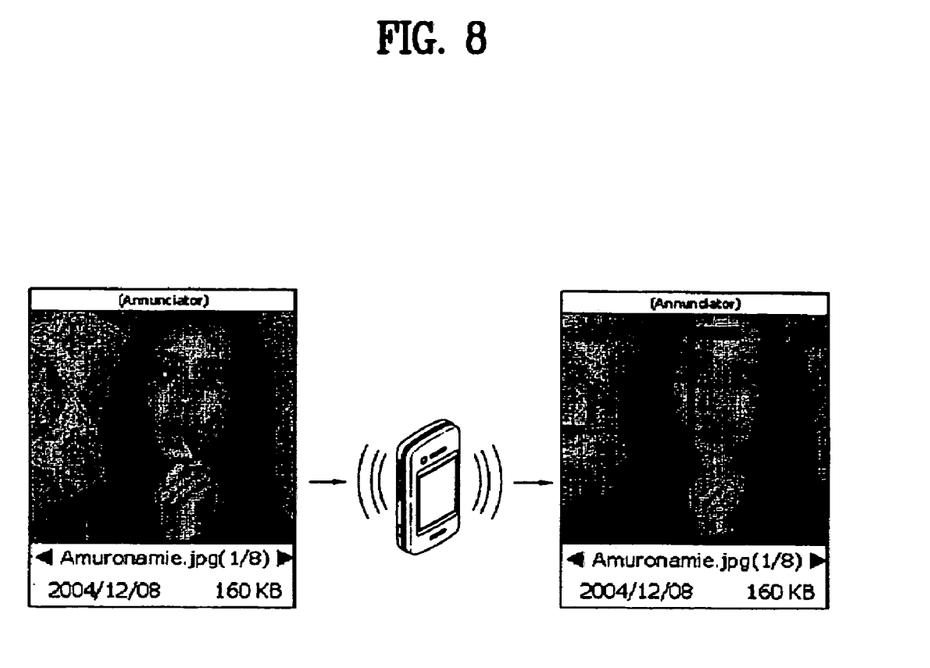
FIG. 8 is a conceptual diagram illustrating a method for encrypting video-data or image-data according to an embodiment of the present invention.

For example, FIG. 8 is a conceptual diagram illustrating a method for encrypting video-data or image-data according to the present invention. In more detail, FIG. 8 shows video data encrypted by the mosaic process from among the above-mentioned video-data encryption methods. Referring to FIG. 8, the video data is mosaic-processed according to the terminal motion such that the video data is encrypted.

3) Encryption of Audio Data

Prior to describing a method for encrypting audio data according to an embodiment of the present invention, it is noted that the audio data indicates recorded data corresponding to a user's voice signal, recorded data corresponding to a user's telephonic communication signals, or sound data including MIDI-sound filter or MP3-sound filter stored in the storage unit 330.

Firstly, the mobile terminal inserts noise corresponding to the terminal motion into the audio data, thereby encrypting the audio data. Secondly, the mobile terminal adjusts a variety of audio-data parameters (e.g., intensity, frequency, and tone of the audio data) contained in the audio data according to the terminal motion, thereby encrypting the audio data.

Further, returning to FIG. 4, the present invention uses a threshold value acting as a reference value of the above-mentioned data encryption. Therefore, if the value calculated at step S403 is equal to or higher than the threshold value, the above-mentioned data encryption is executed.

In addition, the controller 360 stores the encrypted data in the storage unit 330 at step S405. Needless to say, the encrypted data may also be generated from the output unit 340 as necessary. Further, the controller 360 may transmit the encrypted data from to another mobile terminal as necessary.

In more detail, assuming the mobile terminal in FIG. 1 is a first mobile terminal, the controller 360 of the first mobile terminal transmits/receives the encrypted data to/from a second mobile terminal via the communication unit 350 such that the data is shared between the two terminals. A detailed description of the aforementioned data-sharing process between the first and second mobile terminals will be described later with reference to a second preferred embodiment of the present invention.

However, if the controller 360 determines the motion of the mobile terminal does not reach a predetermined encryption level after input data is entered the mobile terminal, namely, if the value calculated at step S403 is less than the threshold value, the controller 360 does not encrypt the input data.

Figure 9:
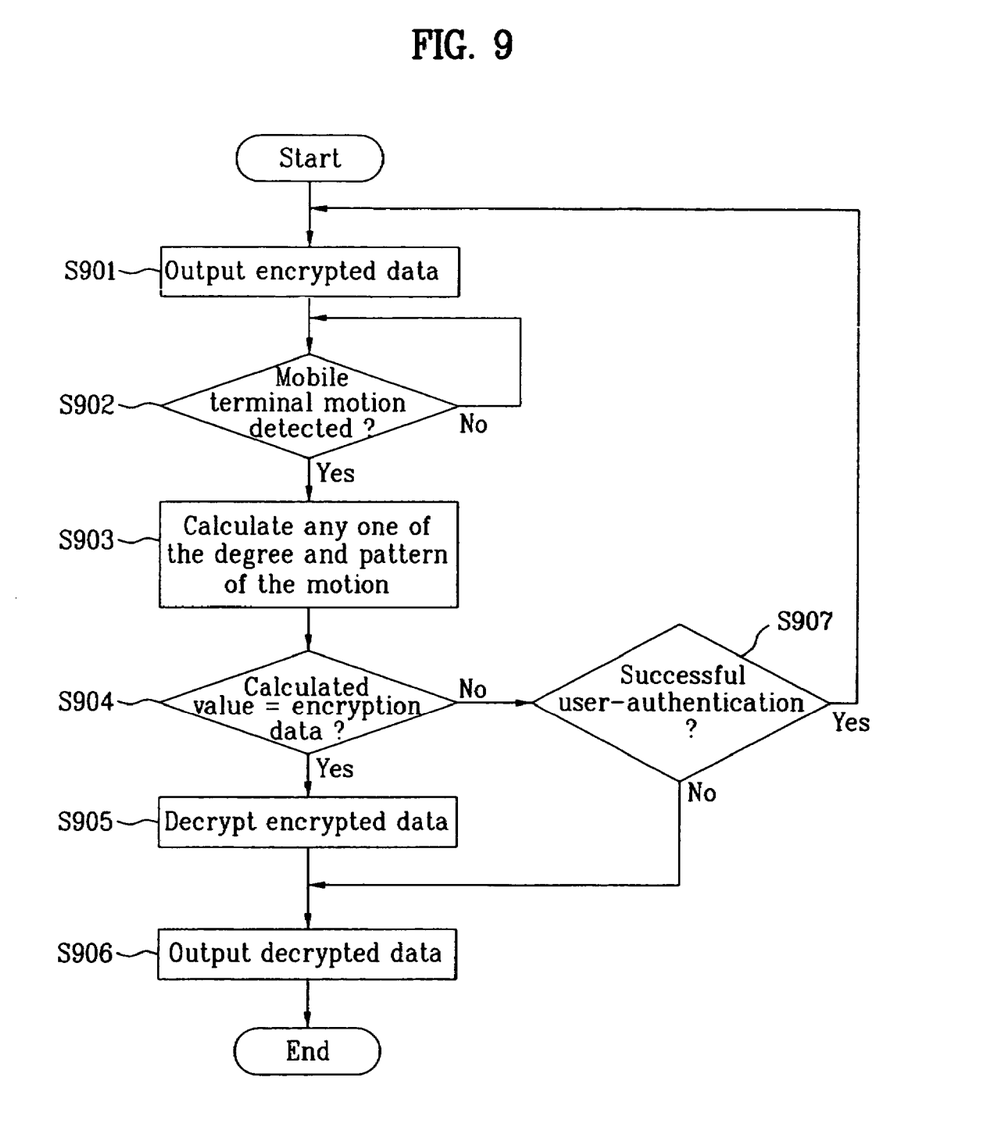
FIG. 9 is a flowchart illustrating a data decryption method according to an embodiment of the present invention.

Turning next to FIG. 9, which is a flowchart illustrating a data decryption method according to an embodiment of the present invention. FIG. 3 will also be referred to in this description.

Referring to FIG. 9, the controller 360 controls the output unit 340 according to an encryption-data output request of a user such that the output unit 340 outputs the encrypted data at step S901. The controller 360 also determines whether the sensing unit 310 detects the motion of the mobile terminal at step S902. If the terminal motion is detected (yes at step S902), the controller 360 numerically calculates the degree and/or pattern of the terminal motion detected by the sensing unit 310 at step S903.

If the calculated value is equal to an encryption value of the data (yes at step S904), the controller 360 decrypts the encrypted data into normal data at step S905, and outputs the decrypted data via the output unit 340 at step S906. The encryption value of the above step S904 indicates any one of the degree and pattern of the terminal motion on the condition that the data is encrypted according to the terminal motion.

If the calculated value of the step S903 is equal to the encryption value of the step S904, the controller 360 decrypts the encrypted data into original normal data. Otherwise, if the calculated value of the step S903 is different from the encryption value of the step S904, the controller 360 performs a user authentication process to decrypt the encrypted data.

In addition, the above-mentioned user authentication process preferably queries a user for a specific password (or number) established when the data is stored in the mobile terminal, and determines whether a response to the query is equal to the specific password (or number).

If the user authentication is successful (yes at step S907), the controller 360 decrypts the encrypted data into original normal data, and outputs the decrypted data to the output unit 340 such that the output unit 340 outputs the decrypted data. Otherwise, if the user authentication fails (no at step S907), the controller 360 outputs the encrypted data via the output unit 340 without any change.

Second Preferred Embodiment

The second preferred embodiment of the present invention relates to a method for sharing encrypted data between a first mobile terminal and a second mobile terminal.

Figure 10:
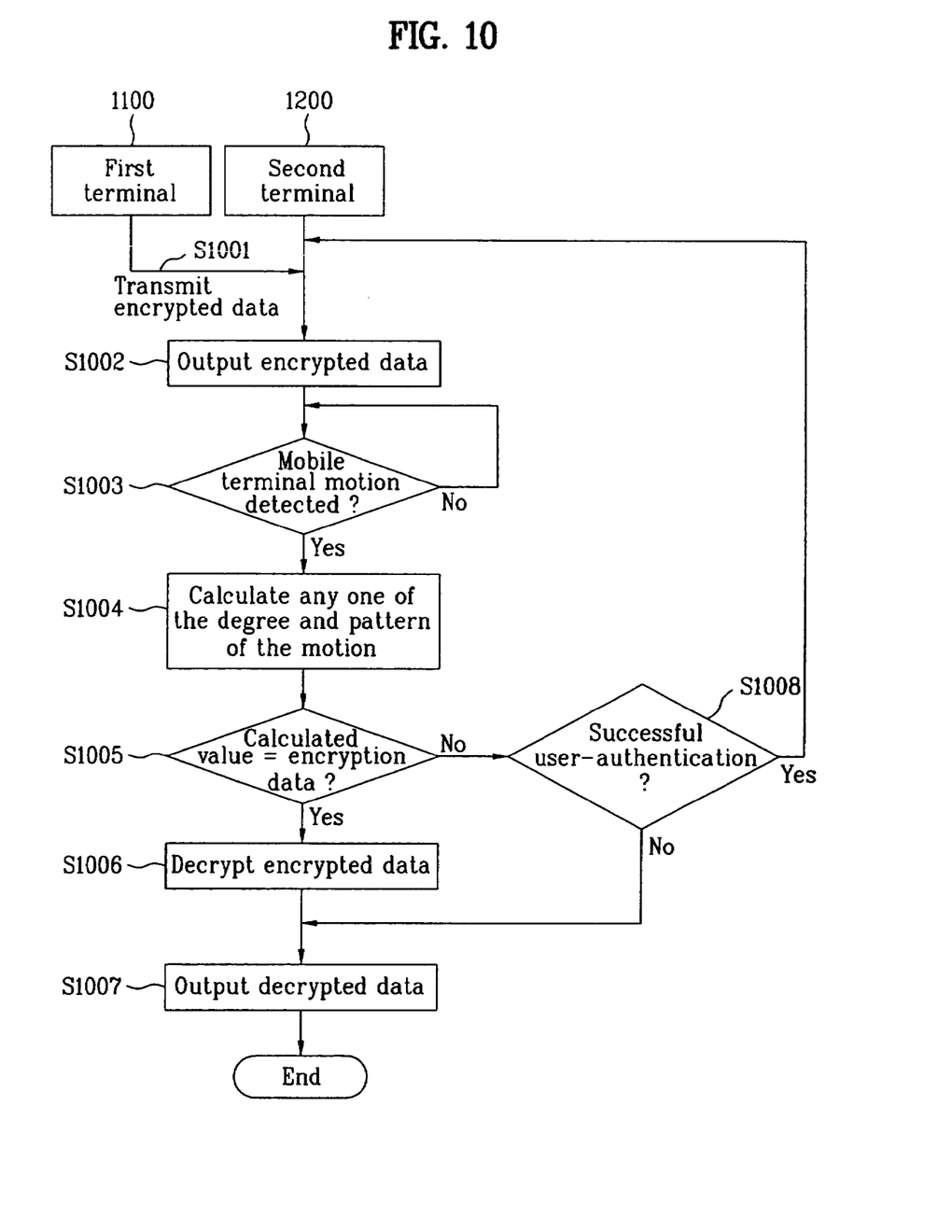
FIG. 10 is a flowchart illustrating a method for sharing encrypted data between first and second mobile terminals according to an embodiment of the present invention.

In more detail, FIG. 10 is a flowchart illustrating a method for sharing encrypted data between first and second mobile terminals according to an embodiment of the present invention. Referring to FIG. 10, the first mobile terminal 1100 transmits data encrypted by the method of FIG. 4 to the second mobile terminal 1200 at step S1001. The second mobile terminal 1200 outputs the encrypted data at step S1002, and determines the presence or absence of the terminal motion at step S1003.

If the terminal motion is detected (yes at step S1003), the second mobile terminal 1200 numerically calculates the degree or pattern of the detected motion at step S1004. If the calculated value is equal to an encryption value established in the data at step S1005, the second mobile terminal 1200 decrypts the encrypted data into original normal data at step S1006, and outputs the decrypted data at step S1007.

The encryption value of the step S1005 indicates the calculation value of any one of the degree and pattern of the terminal motion on the condition that the data is encrypted according to the terminal motion. In other words, if the calculated value of the step S1004 is equal to the encryption value of the step S1005, the second mobile terminal 1200 decrypts the encrypted data into original normal data.

If the calculated value of the step S1004 is different from the encryption value established in the data (no at step S1005), the second mobile terminal 1200 performs a user authentication process to decrypt the encrypted data. In addition, the above-mentioned user authentication process preferably queries a user for a specific password (or number) established when the data is encrypted, and determines whether a response to the query is equal to the predetermined password (or number).

If the user authentication is successful (yes at step S1008), the second mobile terminal 1200 decrypts the encrypted data into original normal data, and outputs the decrypted data to the output unit 340 such that the output unit 340 outputs the decrypted data. Otherwise, if the user authentication fails (no at step S1008), the second mobile terminal 1200 stores the encrypted data.

A detailed description of a variety of operations of the second mobile terminal 1200 will hereinafter be described with reference to FIG. 11. In more detail, FIG. 11 is a block diagram illustrating the second mobile terminal according to an embodiment of the present invention.

Figure 11:
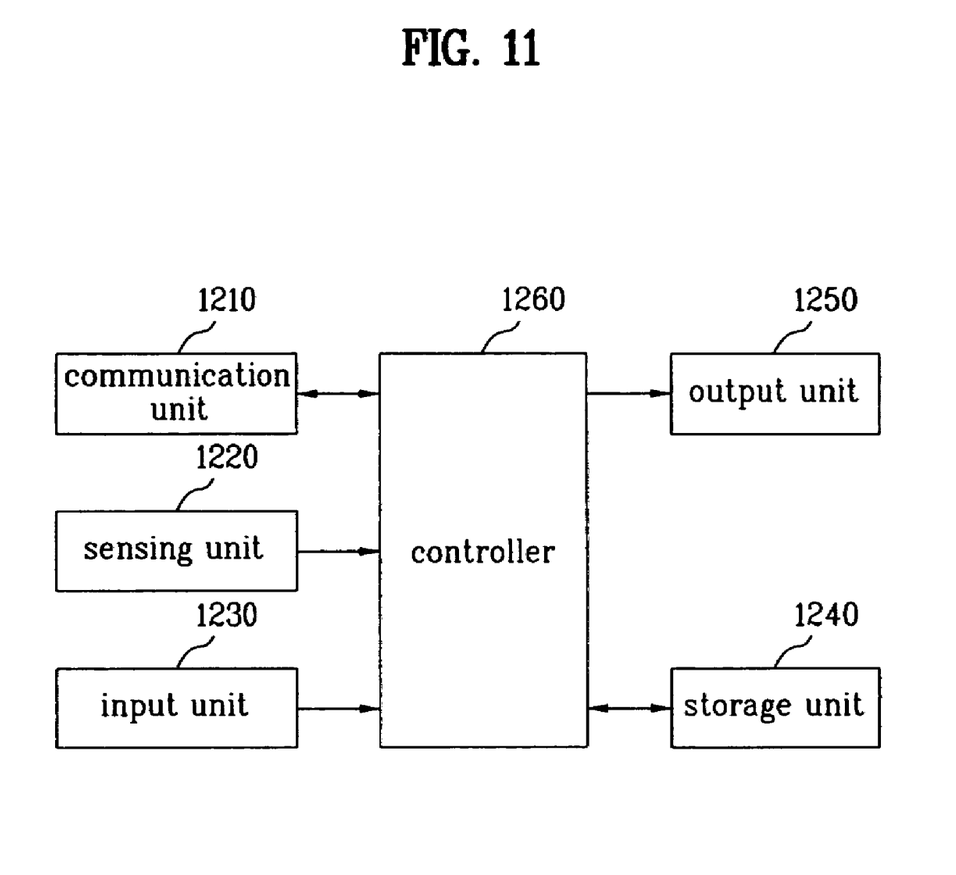
FIG. 11 is a block diagram illustrating the second mobile terminal in FIG. 10 according to an embodiment of the present invention.

Referring to FIG. 11, the second mobile terminal 1200 includes a communication unit 1210, a sensing unit 1220, an input unit 1230, a storage unit 1240, an output unit 1250, and a controller 1260. The communication unit 1210 receives encrypted data from the first mobile terminal 1100, and the sensing unit 1220 is a gyroscope sensor (also called a gyro-sensor).

Further, the sensing unit 1220 detects the motion of the second mobile terminal 1200 according to the external force (e.g., an external impact or vibration). In other words, the sensing unit 1220 detects the degree of the motion of the second mobile terminal 1200.

In more detail, and as discussed with respect to the sensing unit 310 in FIG. 3, the sensing unit 1220 includes a specific rotation body to detect characteristics of a dynamic motion of the rotation body such that the sensing unit 1220 can detect the motion of the second mobile terminal 1200. Further, the sensing unit 1220 detects any one of the degree and pattern of the terminal 1200's motion based on speed-information, acceleration-information, and direction-information of the terminal 1200's motion.

Therefore, if a user moves the second mobile terminal 1200, the sensing unit 1220 measures the direction and speed (or acceleration) of the moving terminal. In addition, the input unit 1230 acting as a user interface includes a plurality of number keys and a plurality of function keys such that the input unit 1230 outputs a variety of key signals associated with the above-mentioned keys to the controller 1260. Also, the input unit 1230 preferably includes not only the above-mentioned keys but also a touch-panel or touch-screen for the mobile terminal.

In addition, the storage unit 1240 stores a specific program for controlling the overall operations of the second mobile terminal 1200, and includes various I/O (Input/Output) data for controlling the second mobile terminal 1200. The storage unit 1240 also stores encrypted data (or modified-data or distorted-data) received from the communication unit 1210 according to an embodiment of the present invention.

The output unit 1250 outputs normal data or encrypted data (or modified or distorted data), and includes a display (not shown) and a sound generator (not shown) such as a speaker. The display displays the normal data or the encrypted (or modified or distorted) character-data or video-data on a screen of the mobile terminal, and the sound generator audibly outputs the normal data or the encrypted (or modified or distorted) audio data.

Further, the controller 1260 controls the output unit 1250, and determines whether the sensing unit 1220 detects the motion of the second mobile terminal 1200 on the condition that the communication unit 1210 outputs the encrypted data.

If the motion of the second mobile terminal 1200 is detected, the controller 1260 numerically calculates the degree or pattern of the detected motion. If the calculated value is equal to an encryption value established in the data, the controller 1260 decrypts the encrypted data into original normal data, and outputs the decrypted data via the output unit 1250. Otherwise, if the calculated value is different from the encryption value, the controller 1260 performs user authentication to decrypt the encrypted data.

Preferably, the above-mentioned user authentication process queries a user for a specific password (or number) established when the first mobile terminal 1100 encrypts the data, and determines whether a response to the query is equal to the specific password (or number).

If the user authentication is successful, the controller 1260 decrypts the encrypted data into original normal data, and outputs the decrypted data to the output unit 1250 such that the output unit 1250 outputs the decrypted data. Otherwise, if the user authentication fails, the controller 1260 stores the encrypted data in the storage unit 1240.

As apparent from the above description, the data encryption/decryption method and a mobile terminal thereof according to an embodiment of the present invention encrypt data according to the motion of a user, instead of the related art method such as a password-entry method, resulting in the protection of the user's private concerns.

The data encryption/decryption method and the mobile terminal according to the embodiments of the present invention also perform transmission/reception of encrypted data from a first mobile terminal to a second mobile terminal such that data is shared between the first and second mobile terminals.

In addition, the above described mobile terminal may be a PDA, a PMP, a mobile phone, a smart phone, a DMB terminal, a game machine, etc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display configured to display one of character data and video data;
   an output unit configured to output audio data;
   a sensing unit configured to detect a motion of the mobile terminal; and
   a controller configured to calculate a value of at least one from a degree and a pattern of the terminal motion detected by the sensing unit, and to encrypt at least one of the character data, the video data and the audio data according to the calculated value,
   wherein the controller is further configured to shadow the character data according to the calculated value such that the controller encrypts the character data, to change an arrangement order of pixels of the video data to another arrangement order according to the calculated value such that the controller encrypts the video data, and to insert noise corresponding to the calculated value into the audio data such that the controller encrypts the audio data.

2. The mobile terminal according to claim 1, wherein the sensing unit is a gyro-sensor.

3. The mobile terminal according to claim 1, wherein the controller is further configured to modify parameter values of the audio data according to the calculated value such that the controller encrypts the audio data.

4. The mobile terminal according to claim 1, wherein the controller is further configured to modify parameter values of the video data according to the calculated value such that the controller encrypts the video data.

5. The mobile terminal according to claim 1, wherein the controller is further configured to insert pixels corresponding to the calculated value into the video data such that the controller encrypts the video data.

6. The mobile terminal according to claim 1, wherein the controller is further configured to perform a mosaic process on the video data according to the calculated value such that the controller encrypts the video data.

7. The mobile terminal according to claim 1, wherein if the sensing unit detects the mobile terminal motion corresponding to the calculated at least one from the degree and the pattern of the terminal motion after the at least one of the character data, the video data and the audio data is encrypted, the controller is further configured to decrypt the encrypted data.

8. The mobile terminal according to claim 1, further comprising:
   a communication unit configured to transmit the encrypted data to another terminal.

9. A data encryption method for a mobile terminal, the method comprising:
   outputting at least one of character data, video data and audio data by a display or an output unit of the mobile terminal;
   detecting, via a sensing unit, a motion of the mobile terminal;
   calculating, via a controller, a value of at least a degree and a pattern of the detected motion; and
   encrypting, via the controller, at least one of the character data, the video data and the audio data according to the calculated value,
   wherein the character data is encrypted by shadowing the character data according to the calculated value, the video data is encrypted by changing an arrangement order of pixels of the video data to another arrangement order according to the calculated value, and the audio data is encrypted by inserting noise corresponding to the calculated value into the audio data.

10. The data encryption method according to claim 9, wherein the detecting step includes:
    detecting the motion of the mobile terminal using a gyro-sensor contained in the mobile terminal.

11. The data encryption method according to claim 9, wherein the audio data is encrypted by modifying parameter values of the audio data according to the calculated value.

12. The data encryption method according to claim 9, wherein the video data is encrypted by modifying parameter values of the video data according to the calculated value.

13. The data encryption method according to claim 9, wherein the video data is encrypted by inserting pixels corresponding to the calculated value into the video data.

14. The data encryption method according to claim 9, wherein the video data is encrypted by performing a mosaic process on the video data according to the calculated value.

15. The data encryption method according to claim 9, further comprising:
    decrypting the encrypted data if the detecting step detects the terminal motion corresponding to the calculated value after the at least one of the character data, the video data and the audio data is encrypted.

16. The data encryption method according to claim 9, further comprising:
    transmitting the encrypted data to another terminal.

* * * * *